Patented Apr. 6, 1943

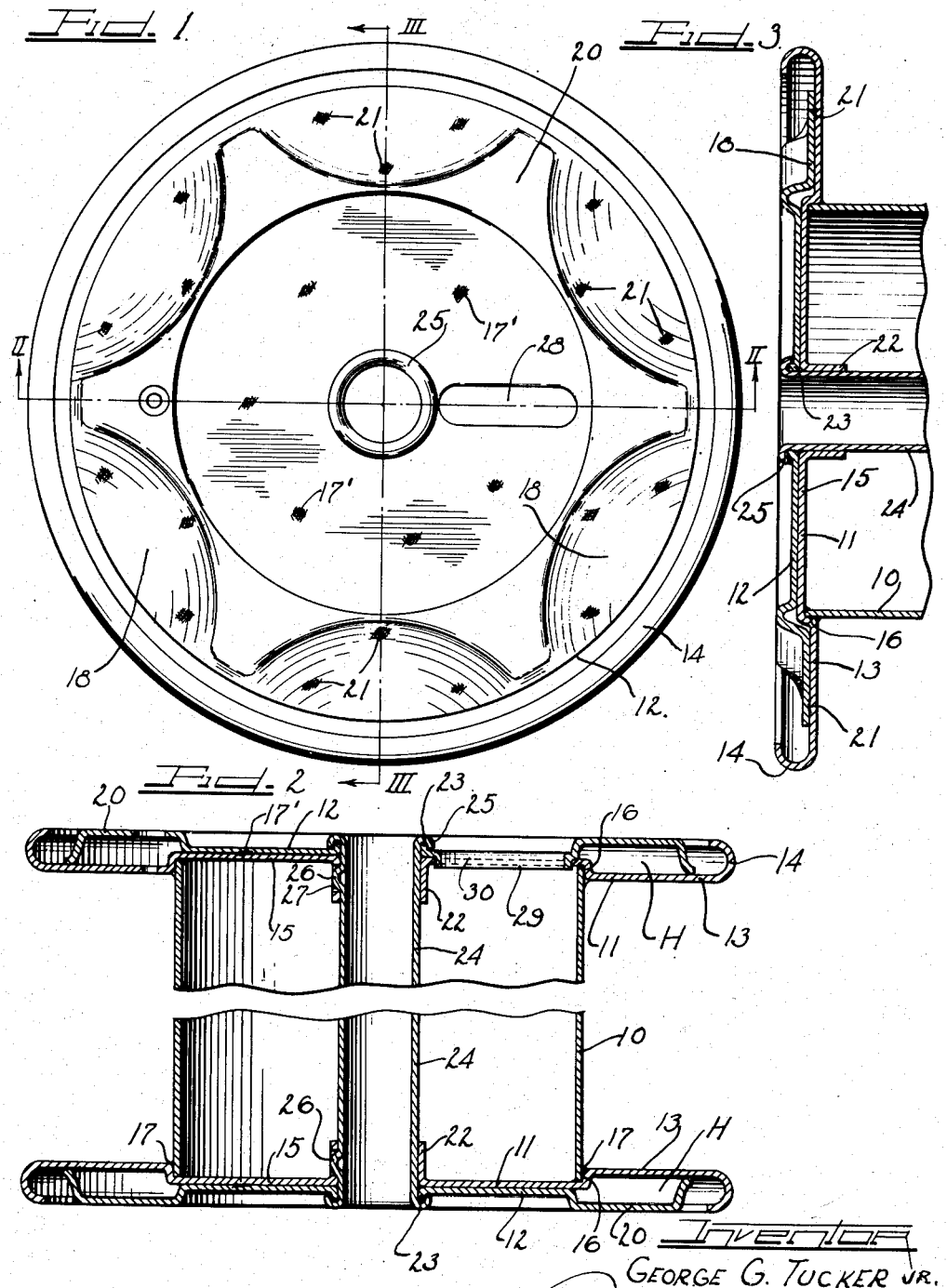

2,316,028

UNITED STATES PATENT OFFICE 2,316,028

SPOOL

George G. Tucker, Jr., Berwyn, Ill., assignor to Hubbard Spool Company, Chicago, Ill., a corporation of Illinois Application October 6, 1941, Serial No. 413,736

4 Claims. (Cl. 242—123)

My invention relates to spools constructed entirely of sheet metal and adapted particularly for carrying heavier material such as wire. The object of the invention is to produce a comparatively light spool with the various sheet metal parts so arranged and secured together to cooperate to produce a strong and endurable spool capable of resisting the heavy service under which it is used.

The various features of my invention will be apparent from the structure shown on the drawing, and the accompanying description.

In the drawing:

Figure 1 is an end view of a spool;

Figure 2 is a section on plane II—II of Figure 1; and

Figure 3 is a section of one end of the spool taken on plane III—III of Figure 1.

The spool shown comprises a tubular barrel 10 and head structures H. Each head structure comprises an inner or main head member 11 and an outer or reinforcing head member 12. The inner members 11 extend across the barrel ends and beyond the ends to form flanges 13 which with the barrel provide the space on which wire is to be wound on the spool. The peripheral portion of each inner member 11 is deflected outwardly into substantially semicircular cross section to provide a strengthening rim or tire 14. The portion 15 of each head member 11 where it engages with the barrel end is deflected outwardly to provide an annular seating shoulder 16 against which the barrel end engages radially, these annular shoulders holding the barrel to true circular cross section. In order to fill the corners between the flange portions 13 and the barrel so as to prevent catching of wire, these corners may be filled out with solder or some other flux, as indicated at 17.

Each outer head member 12 has a middle portion resting against the outside of the deflected portion 15 of the corresponding inner head element and is secured thereto, preferably by spot welding as indicated at 17'. At regular intervals the peripheral portion 18 of each outer head member is offset outwardly to form the substantially frusto-conical shaped portions 20 spaced outwardly away from the flange 13 of the corresponding inner head member. Six of such deflected portions 20 are shown, although there may be any number. The outer surfaces of these deflected portions 20 are in the plane of the outer surfaces of the rims 14 on the inner head members, as clearly shown on Figures 2 and 3. The parts of the portion 18 which remain seated against the flanges of the inner head members are secured to these flanges preferably by spot welding as indicated at 21.

Each inner head member 11 has an axial passageway formed by a circular flange 22 extending inwardly and each outer head member has an axial passageway defined by an outwardly extending circular flange 23. At each end of the spool these aligned flanges receive the arbor tube 24 which extends through the barrel, the end portions 25 of this arbor tube being deflected around the respective flanges 23 on the outer head members to interlock therewith. This carrying over of the arbor tube ends around the flanges 23 causes the head structures H to be securely clamped against the corresponding ends of the barrel. In order to strengthen the center portions of the head structures against axial displacement inwardly, and to maintain the interlock between the arbor tube and the flanges on the outer head members, the arbor tube may be provided with abutment beads or projections 26 engaging in openings or recesses 27 provided in the flanges 22 of the inner head members 11, as clearly shown on Figure 2.

To provide an opening for receiving pins for driving the spool for winding or unwinding, an elongated opening 28 is provided in one or both of the outer head members 12, and the metal surrounding this opening being deflected downwardly in the form of a flange 29 through an opening 30 in the inner head member 11, this flange providing ample driving engagement for the driving pins.

I thus produce a comparatively light weight sheet metal spool in which the various elements are assembled and secured to afford strength and rigidity against distortion or breakage under heavy service conditions. I have shown a practical and efficient embodiment of the features of my invention but I do not desire to be limited to the exact construction and arrangement shown and described as changes and modifications may be made without departing from the scope of the invention.

I claim as follows:

1. A sheet metal spool comprising a barrel, head structures for the barrel each comprising an inner member and an outer member, the inner member of each head structure extending beyond the respective barrel end to form a flange and having its portion adjacent to the barrel end deflected outwardly to form an annular seat for the barrel end, the outer member of each head structure being spot welded to the inner member thereof and having portions adjacent to the respective flange deflected outwardly to form trusses for the flange, the inner member of each head structure having an axial passageway therethrough surrounded by an inwardly extending flange and the outer member of each head structure having an axial passageway surrounded by an outwardly extending flange in alignment with the corresponding inwardly extending flange, an arbor tube extending at its ends through said respective flanges and having its outer ends deflected around the outwardly extending flanges on said outer members whereby to hold said head structures intimately against the barrel ends.

2. A sheet metal spool comprising a barrel, head structures for said barrel each comprising an inner member and an outer member, the inner member of each head structure projecting beyond the end of the barrel to form a flange and having its portion adjacent the barrel end deflected outwardly to form an annular seat for the barrel end, the outer member of each head structure being secured to the inner member thereof by spot welding, each inner member having an axial passage therethrough surrounded by an inwardly extending flange and each outer member having an axial passage therethrough surrounded by an outwardly extending flange in alignment with said inwardly extending flange, and an arbor tube extending through said barrel and said passages and interlocked at its ends with said inwardly and outwardly extending flanges to hold the head structures against the barrel ends and to hold said arbor tube against rotational displacement relative to said heads.

3. A sheet metal spool comprising a barrel, head structures each comprising an outer and an inner member, the inner member of each head structure having the portion beyond the respective barrel end forming a flange and having its portion adjacent to the barrel end deflected outwardly to provide an annular seat for the barrel end, each inner member having an axial passage therethrough surrounded by an inwardly extending flange and each outer member having an axial passage therethrough surrounded by an outwardly extending flange in alignment with the inwardly extending flange, an arbor tube extending through said passageways and interlocked at its ends with said inwardly and outwardly extending flanges, the edge portion of the flange on each head structure being deflected outwardly to form a rim of substantially semi-circular cross section, portions of the outer member of each head structure adjacent to the corresponding flange being deflected outwardly away from the flange to form trusses for strengthening the flange against lateral pressure by wire or other material wound on the spool, the outer surfaces of said deflection being in a common plane with the outer surface of said semi-circular rim.

4. A sheet metal spool comprising a barrel, head structures for said barrel each comprising an inner member and an outer member, the inner member of each head structure projecting beyond the end of the barrel to form a flange, each inner member having an axial passage therethrough surrounded by an inwardly extending flange and each outer member having an axial passage therethrough surrounded by an outwardly extending flange in alignment with the inwardly extending flange, an arbor tube in said barrel extending at its ends through said passageways, the outer ends of said arbor tube being interlocked with said outwardly extending flanges, said inwardly extending flanges having openings, and outward deflections on said arbor tube extending into said openings whereby said heads will be held against the barrel end and said arbor tube and heads held against relative rotational displacement.

GEORGE G. TUCKER, JR.